United States Patent
Mizuguchi et al.

(10) Patent No.: US 9,112,612 B2
(45) Date of Patent: Aug. 18, 2015

(54) RELAY DEVICE, STATION-SIDE OPTICAL COMMUNICATION DEVICE, COMMUNICATION SYSTEM, AND BANDWIDTH ALLOCATION METHOD

(75) Inventors: Jun Mizuguchi, Tokyo (JP); Yoshifumi Hotta, Tokyo (JP); Koshi Sugimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 62 days.

(21) Appl. No.: 13/819,781

(22) PCT Filed: Dec. 27, 2010

(86) PCT No.: PCT/JP2010/073576
§ 371 (c)(1),
(2), (4) Date: Feb. 28, 2013

(87) PCT Pub. No.: WO2012/090274
PCT Pub. Date: Jul. 5, 2012

(65) Prior Publication Data
US 2013/0177314 A1    Jul. 11, 2013

(51) Int. Cl.
*H04B 10/29* (2013.01)
*H03J 3/06* (2006.01)
(Continued)

(52) U.S. Cl.
CPC ............. *H04B 10/29* (2013.01); *H04J 3/0655* (2013.01); *H04Q 11/0067* (2013.01); *H04Q 11/0071* (2013.01); *H04Q 2011/0064* (2013.01); *H04Q 2011/0088* (2013.01)

(58) Field of Classification Search
CPC ................................. H04B 10/29; H04B 10/40
USPC ................. 398/62, 97, 173–181; 356/348
See application file for complete search history.

(56) References Cited

U.S. PATENT DOCUMENTS 6,047,177 A * 4/2000 Wickman .................. 455/422.1
7,386,236 B1 * 6/2008 Kuo et al. ....................... 398/99
(Continued)

FOREIGN PATENT DOCUMENTS

CN    101466052 A    6/2009
JP    2 143737        6/1990
(Continued)

OTHER PUBLICATIONS

"Technical Fundamentals Lecture [GE-PON Technology], Section 1, What is PON," NTT Technical Journal, pp. 71-74, (Aug. 2005) (with partial English translation).
(Continued)

*Primary Examiner* — David Payne
*Assistant Examiner* — Casey Kretzer
(74) *Attorney, Agent, or Firm* — Oblon, McClelland, Maier & Neustadt, L.L.P.

(57) ABSTRACT

A relay device that relays communication between a low-speed communication device performing uplink 1 G transfer and a high-speed communication device performing uplink 10 G transfer and a station-side optical communication device, wherein the relay device includes a low-speed reception unit that converts an optical signal received from the low-speed communication device to an electric signal, a buffer that buffers the electric signal, and a high-speed transmission unit that transmits, to the station-side optical communication device, a bandwidth allocation request requesting bandwidth allocation for communication from its own unit to the station-side optical communication device, and within a transmission permitted time period allocated by the station-side optical communication device, reads an electric signal stored in the buffer, converts the electric signal to an optical signal having a communication speed of 10 G, and transmits the optical signal.

5 Claims, 16 Drawing Sheets

(51) Int. Cl.
*H04Q 11/00* (2006.01)
*H04J 3/06* (2006.01)

(56) References Cited

U.S. PATENT DOCUMENTS

2009/0028562 A1* 1/2009 Gianordoli et al. ............. 398/61
2009/0162065 A1* 6/2009 Mizutani et al. ................ 398/66
2009/0213874 A1* 8/2009 Levit .............................. 370/468
2011/0142443 A1* 6/2011 Hirth et al. ..................... 398/25
2012/0121265 A1* 5/2012 Suvakovic et al. ............. 398/66

FOREIGN PATENT DOCUMENTS

| JP | 7 327053 | 12/1995 |
|----|----------|---------|
| JP | 2000 41003 | 2/2000 |
| JP | 2000 183902 | 6/2000 |
| JP | 2000 196620 | 7/2000 |
| JP | 2001 251265 | 9/2001 |
| JP | 2007 295151 | 11/2007 |
| WO | 2008 072347 | 6/2008 |
| WO | WO2010/119587 A1 | 10/2010 |

OTHER PUBLICATIONS

Kani, J., et al., "Standardization Trends of Next-generation 10 Gigabit-class PON Systems," NTT Technical Journal, pp. 90-93, (Sep. 2009) (with partial English translation).
International Search Report Issued Apr. 5, 2011 in PCT/JP10/73576 Filed Dec. 27, 2010.
Office Action in Chinese patent application 201080069075.5 issued Feb. 27, 2015 with an English translation.

* cited by examiner

Discovery GATE FRAME

FIG.7

Discovery Gate Frame Information Fields

| Bit | Flag Field | VALUE |
|---|---|---|
| 0 | OLT is 1G upstream capable | 0-OLT does not support 1 Gbps reception<br>1-OLT supports 1 Gbps reception |
| 1 | OLT is 10G upstream capable | 0-OLT does not support 10 Gbps reception<br>1-OLT supports 10 Gbps reception |
| 2-3 | reserved | - |
| 4 | OLT is opening 1G discovery window | 0-OLT cannot receive 1 Gbps data in this window<br>1-OLT can receive 1 Gbps data in this window |
| 5 | OLT is opening 10G discovery window | 0-OLT cannot receive 10 Gbps data in this window<br>1-OLT can receive 10 Gbps data in this window |
| 6-15 | reserved | - |

FIG.8

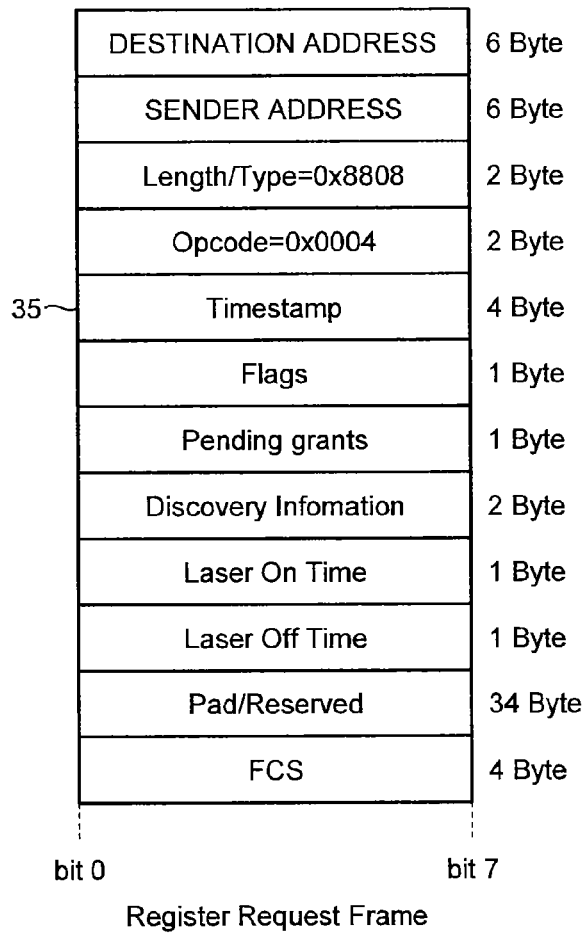

Register Request Frame

Normal GATE FRAME

Report FRAME

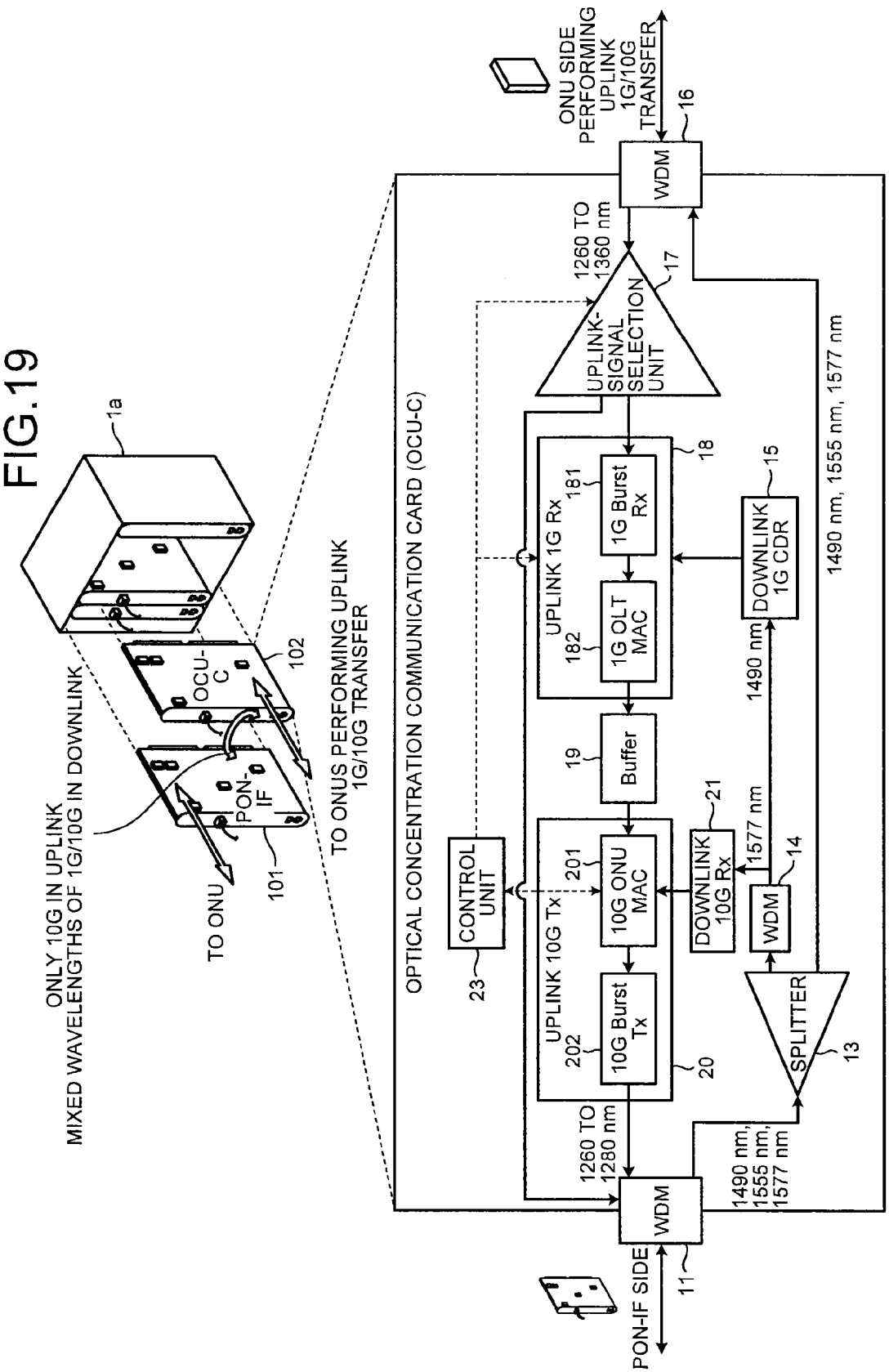

RELAY DEVICE, STATION-SIDE OPTICAL COMMUNICATION DEVICE, COMMUNICATION SYSTEM, AND BANDWIDTH ALLOCATION METHOD

FIELD

The present invention relates to a relay device, a station-side optical communication device, a communication system and a bandwidth allocation method in a PON (Passive Optical Network) system.

BACKGROUND

In recent years, various information services (data, sound, broadcasting, wireless data, and the like) using an access network between subscribers and a station have been widely provided. With wide-spreading of these information services, usage of a P2MP (Point-to-Multi Point) PON (Passive Optical Network) system, which realizes inexpensive and stable high bandwidth communication even if subscribers are away from a station, has been widespread as an alternative to xDSLs (Digital Subscriber Lines), which is a transfer method using a metal line.

In commercial access networks using the PON system, there have been services of a GE (Gigabit Ethernet®)-PON (see Non Patent Literature 1 mentioned below), in which WDM (Wave Division Multiplexing) that is capable of performing two-way communication with one optical fiber transfer line is used. Furthermore, in GE PONS, TDM (Time Division Multiplexing) is applied to a downlink (OLT (Optical Line Terminal)→ONU (Optical Network Unit)) and TDMA (Time Division Multiple Access) is applied to an uplink (ONU→OLT).

Further, development of a 10 G-EPON (see Non Patent Literature 2 mentioned below) having a bit rate 10 times faster than that of the GE-PON has been in progress while applying a high-speed TDM technique.

CITATION LIST

Non Patent Literatures

Non Patent Literature 1: "Technical Fundamentals Lecture [GE-PON Technology], Section 1, What is PON", NTT Technical Journal, 2005. 8, Page. 71-74

Non Patent Literature 2: Junichi KANI and Kenichi SUZUKI, "Standardization Trends of Next-generation 10 Gigabit-class PON Systems", NTT Technical Journal, 2009. 9, Page. 90-93

SUMMARY

Technical Problem

However, according to the above conventional techniques, because the TDMA method is used for uplink transfer, when a station-side communication device terminates a signal transmitted from a subscriber-side optical communication device having a different uplink communication speed, a longer time needs to be allocated to the uplink communication, if there are many subscriber-side optical communication devices having a low uplink communication speed. As a result, a guaranteed minimum bandwidth may not be secured with respect to each subscriber-side optical communication device.

The present invention has been achieved to solve the above problems, and an object of the present invention is to provide a relay device, a station-side optical communication device, a communication system, and a bandwidth allocation method that can realize high-bandwidth uplink communication of a subscriber-side optical communication device, when subscriber-side optical communication devices having a different uplink communication speed are present in a mixed manner in a PON system.

Solution to Problem

In order to solve above-mentioned problems and achieve the object, there is provided a relay device according to the present invention, in a communication system including subscriber-side optical communication devices and a station-side optical communication device that allocates a bandwidth to the subscriber-side optical communication devices, connected to a low-speed communication device, which is the subscriber-side optical communication device that transmits an optical signal having a first communication speed, and a high-speed communication device, which is the subscriber-side optical communication device that transmits an optical signal having a second communication speed higher than the first communication speed, to relay communication between the low-speed communication device and the high-speed communication device and the station-side optical communication device, the relay device comprising: a low-speed reception unit that converts an optical signal received from the low-speed communication device to an electric signal; a buffer that buffers the electric signal; and a high-speed transmission unit that transmits, to the station-side optical communication device, a bandwidth allocation request requesting bandwidth allocation for communication from its own unit to the station-side optical communication device, and within a transmission permitted time period allocated by the station-side optical communication device, reads the electric signal stored in the buffer, converts the electric signal to an optical signal having the second communication speed, and transmits the optical signal.

Advantageous Effects of Invention

The relay device, the station-side optical communication device, the communication system, and the bandwidth allocation method according to the present invention can realize high-bandwidth uplink communication of a subscriber-side optical communication device, when subscriber-side optical communication devices having a different uplink communication speed are present in a mixed manner in a PON system.

BRIEF DESCRIPTION OF DRAWINGS

FIG. 7 depicts bit assignment in a discovery information field of the discovery gate frame.

FIG. 8 depicts a format of a register request frame.

FIG. 19 is a functional configuration example of an OLT according to a second embodiment of the present invention.

DESCRIPTION OF EMBODIMENTS

Exemplary embodiments of a relay device, a station-side optical communication device, a communication system, and a bandwidth allocation method according to the present invention will be explained below in detail with reference to the accompanying drawings. The present invention is not limited to the embodiments.

First Embodiment

Figure 1:
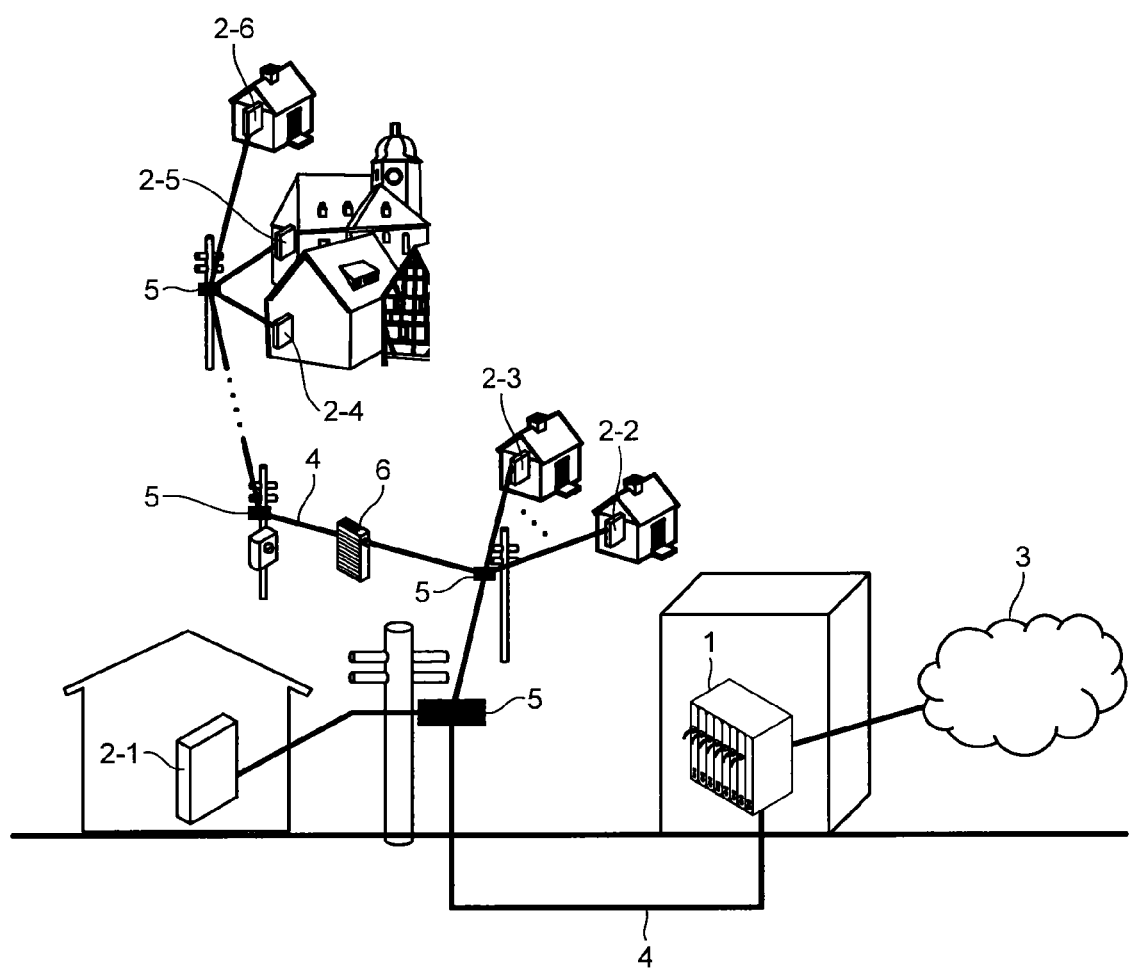
FIG. 1 is a configuration example of a communication system according to a first embodiment.

FIG. 1 is a configuration example of a communication system according to a first embodiment of the present invention. The communication system according to the present embodiment is formed as an EPON (Ethernet® PON) system. In the present embodiment, the EPON system is explained as an example; however, the present invention is not limited thereto, and can be applied to a system adopting other PON mechanisms such as a GPON (Gigabit PON). Furthermore, in the present embodiment, a P2MP PON system is explained as an example; however, the present invention is not limited to the P2MP PON system.

As shown in FIG. 1, the communication system according to the present embodiment includes a station-side optical communication device (OLT) 1, subscriber-side optical communication devices (ONUs) 2-1 to 2-6, a closure 5, and an optical concentration communication unit (OCU: relay device) 6. The OLT 1 and the ONUs 2-1 to 2-6 are connected to each other by an optical fiber 4 arranged in the ground or on a power pole. The closure 5 branches the optical fiber 4 as required. The OLT 1 is connected to a core network 3, to transmit downlink data from the core network 3 to the ONUs 2-1 to 2-6, to the ONUs 2-1 to 2-6 via the optical fiber 4, and receive uplink data from the ONUs 2-1 to 2-6 to the core network 3 via the optical fiber 4 and transmit the received data to the core network 3. In FIG. 1, six ONUs 2-1 to 2-6 are shown; however, the number of the ONUs is not limited thereto.

A case where ONUs corresponding to a GE-PON (a 1 G (bps) uplink communication speed) (low-speed communication devices) and ONUs corresponding to a 10 G-EPON (a 10 G (bps) uplink communication speed) (high-speed communication devices) are present in a mixed manner in the communication system according to the present embodiment is explained here as an example. The communication speed is a value indicating how much data can be transmitted and received in one second. As the communication speed, only two or more kinds of communication speeds need to be present, and the value of the communication speed is not limited to 1 G and 10 G. Furthermore, the operation of the present embodiment can be applied to a case where other techniques such as WDM in which a plurality of wavelengths are multiplexed to realize high bandwidth communication are used for the communication system.

The OCU 6 is a relay device that relays communication between the ONUs 2-4 to 2-6 and the OLT 1. For example, when the ONUs 2-4 to 2-6 are present in a remote area with respect to the OLT 1, the OCU 6 has a function of amplifying the optical signal. In the optical signal transferred by the optical fiber 4, a light intensity thereof decreases as a transfer distance increases. For example, in a remote area where the distance between the OLT and the ONU is 20 kilometers or more, a high-speed large-capacity information service may not be provided. Therefore, the OCU 6 amplifies optical signals transmitted and received between the OLT 1 and the ONUs 2-4 to 2-6 present in the remote area, thereby preventing such a problem. When the ONUs 2-4 to 2-6 are not present in the remote area, the OCU 6 does not need to have the function of amplifying the optical signal.

Figure 2:
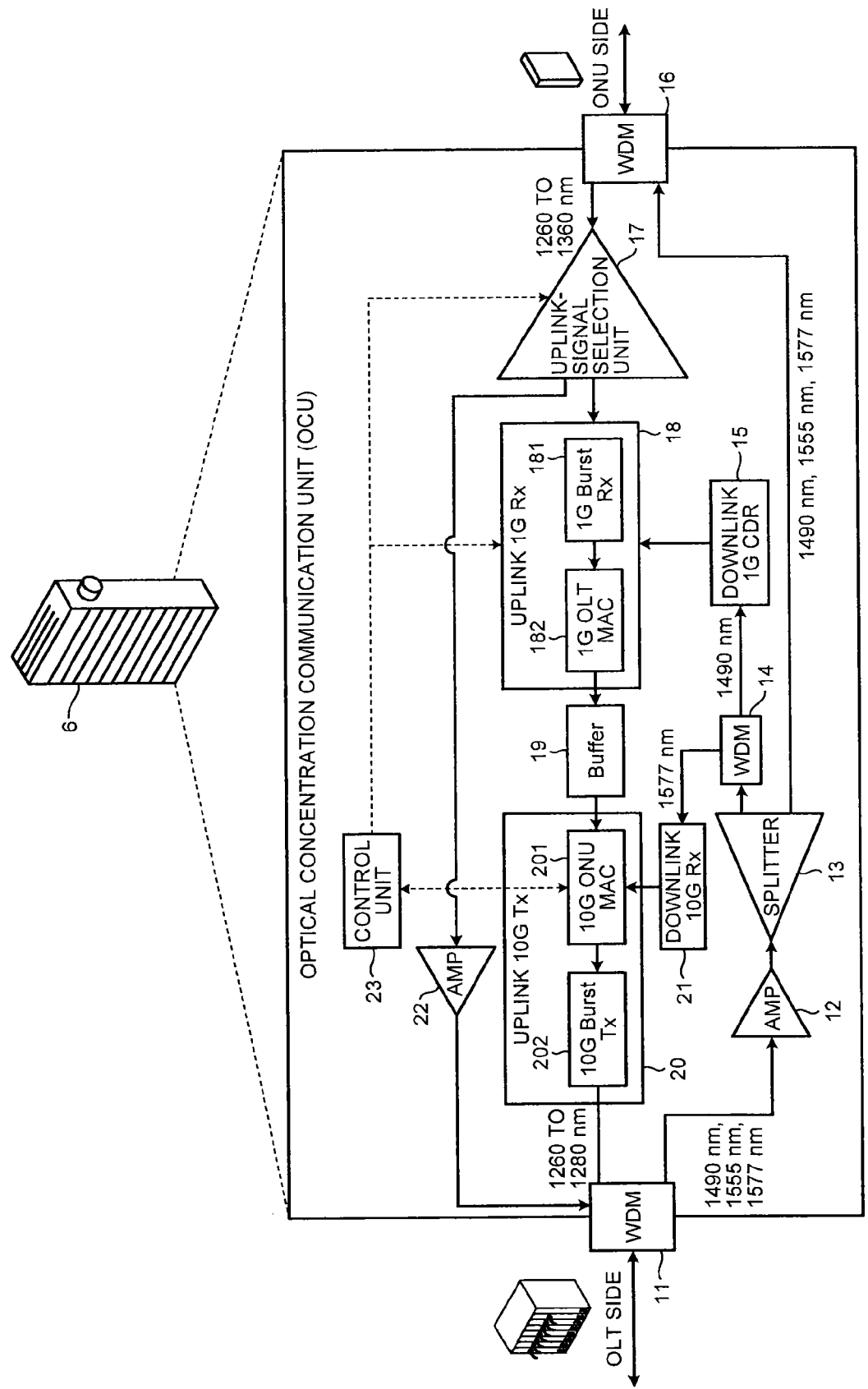
FIG. 2 is a functional configuration example of an optical concentration communication unit (OCU).

FIG. 2 is a functional configuration example of the OCU 6 according to the present embodiment. As shown in FIG. 2, the OCU 6 according to the present embodiment includes a wavelength division multiplexing (WDM) 11, an optical amplification unit (AMP) 12, a splitter 13, a WDM 14, a downlink 1 G CDR (Clock Data Recovery) 15, a WDM 16, an uplink-signal selection unit 17, an uplink 1 G reception unit (Rx) (low-speed reception unit) 18, a buffer (Buffer) 19, an uplink 10 G transmission unit (Tx) (high-speed transmission unit) 20, a downlink 10 G reception unit (Rx) 21, an optical amplification unit (downlink optical amplification unit: AMP) 22, and a control unit 23. In the present embodiment, the AMP 12 is arranged between the WDM 11 and the splitter 13. However, the AMP 12 can be arranged between the splitter 13 and the WDM 16, and the arrangement of the AMP 12 is not limited to the example shown in FIG. 2.

An operation of the OCU 6 is explained next. The operation at the time of receiving a downlink optical signal is explained first. The WDM 11 is connected to the optical fiber 4 on a side of the OLT 1. Upon reception of a downlink optical signal (a wavelength multiplexed signal) transmitted from the OLT 1 via the optical fiber 4, the WDM 11 outputs the received downlink optical signal to the AMP 12. The AMP 12 amplifies the input downlink optical signal and outputs the amplified signal to the splitter 13. The splitter 13 separates the input downlink optical signal into two signals, and outputs one of the separated optical signals to the WDM 14 and outputs the other one to the WDM 16.

The WDM 16 is connected to the optical fiber 4 on a side of the ONUs 2-4 to 2-6, and sends the downlink optical signal input from the splitter 13 to the optical fiber 4.

The WDM 14 separates the downlink optical signal input from the splitter 13 into a signal having a wavelength through which a downlink signal having a communication speed of 1 G (hereinafter, "downlink 1 G signal") is transferred and a signal having a wavelength through which a downlink signal having a communication speed of 10 G (hereinafter, "downlink 10 G signal") is transferred, outputs the downlink 1 G signal to the downlink 1 G CDR 15, and outputs the downlink 10 G signal to the downlink 10 G Rx 21.

Figure 3:
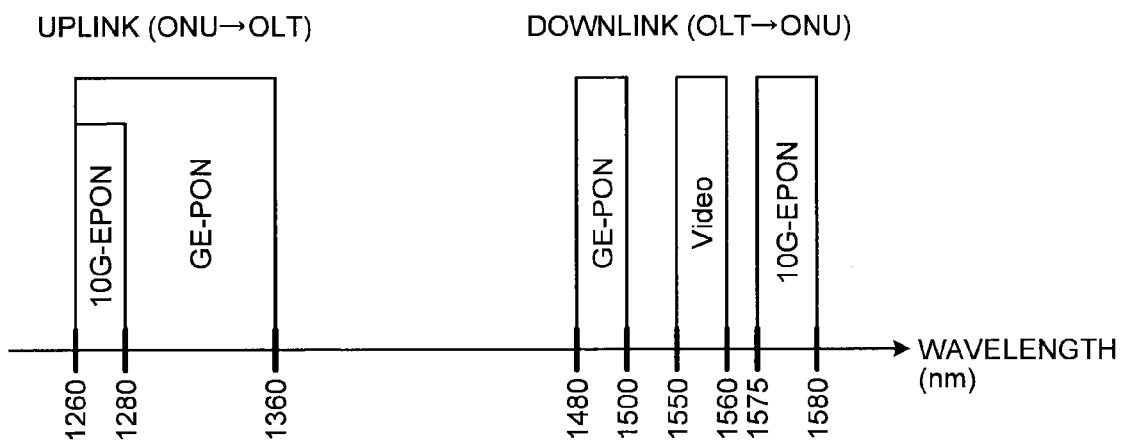
FIG. 3 depicts optical wavelength allocation in a GE-PON and a 10 G-EPON.

FIG. 3 depicts optical wavelength allocation in the GE-PON and the 10 G-EPON. As for the uplink optical signals, a part of an allocated wavelength to the GE-PON and an allocated wavelength to the 10 G-EPON are overlapped on each other. Meanwhile, for the downlink optical signals, a wavelength range not overlapping on each other is respectively allocated to the GE-PON, Video, and the 10 G-EPON. Accordingly, the WDM 14 separates a wavelength (a 1490 nanometer band) of the downlink 1 G signal for the GE-PON and a wavelength (a 1577 nanometer band) of the downlink 10 G signal for the 10 G-EPON based on the optical wavelength allocation, thereby realizing the downlink communication from the OLT to the ONU. As for the uplink optical signals, because there is a wavelength range overlapping between the GE-PON and the 10 G-EPON, it is controlled so that a transmission time period does not overlap for each ONU according to the TDMA method, thereby realizing the uplink communication from the ONU to the OLT.

The downlink 1 G CDR 15 extracts a clock from the input downlink 1 G signal and supplies the clock to the uplink 1 G Rx 18. The downlink 10 G Rx 21 converts the input downlink 10 G signal from an optical signal to an electric signal, and outputs the converted electric signal to the uplink 10 G Tx 20.

The uplink 10 G Tx 20 includes a 10 G ONUMAC (Media Access Control) 201, and a 10 G Burst Tx 202. The 10 G ONUMAC 201 performs analysis such as a gate frame analysis with respect to the input electric signal (the signal transmitted from the OLT 1), controls a transmission timing of the uplink optical signal to the OLT 1, and notifies the control unit 23 of a gate frame analysis result. The gate frame analysis is explained later. The control unit 23 instructs an output destination to be selected by the uplink-signal selection unit 17 based on the gate-frame analysis result. Specifically, the control unit 23 instructs the uplink-signal selection unit 17 to select the uplink 1 G Rx 18 as an output destination in a time period for receiving uplink optical signals having a 1 G communication speed, and instructs the uplink-signal selection unit 17 to select the uplink AMP 22 as the output destination in a time period for receiving uplink optical signals having a 10 G communication speed.

The operation at the time of receiving the uplink optical signal is explained next. The WDM 16 outputs the uplink optical signal received from the optical fiber on the side of the ONUs 2-4 to 2-6 to the uplink-signal selection unit 17. The uplink-signal selection unit 17 selects an output destination (the AMP 22 or the uplink 1 G Rx 18) of the input uplink optical signal based on the instruction from the control unit 23 and outputs the uplink optical signal to the selected output destination.

When the uplink-signal selection unit 17 selects the uplink AMP 22 as the output destination, the uplink optical signal is amplified by the AMP 22 and transmitted to the OLT 1 via the WDM 11. When the uplink-signal selection unit 17 selects the uplink 1 G Rx 18 as the output destination, a 1 G Burst Rx 181 of the uplink 1 G Rx 18 converts the input uplink optical signal to an electric signal and outputs the converted signal to a 1 G OLTMAC 182. The 1 G OLTMAC 182 performs a termination process similar to that of the OLT with respect to the input electric signal, and then stores uplink data included in the electric signal in the buffer 19.

The 10 G ONUMAC 201 reads data stored in the buffer 19 in a transmission time period allocated to its own unit based on the gate-frame analysis result, and outputs the data to the 10 G Burst Tx 202. The 10 G Burst Tx 202 converts the input data to an optical signal having a wavelength of the 10 G-EPON (1260 nanometers to 1290 nanometers), and transmits the converted signal to the OLT 1 via the WDM 11 with a communication speed of 10 G.

As described above, the OCU 6 amplifies intensities of the uplink and downlink optical signals having a communication speed of 10 G and the downlink optical signal having a communication speed of 1 G by the AMP 12 or the AMP 22. The uplink optical signal having the communication speed of 1 G is once stored in the buffer 19, and transmitted to the OLT 1 as an uplink signal having the communication speed of 10 G.

Figure 4:
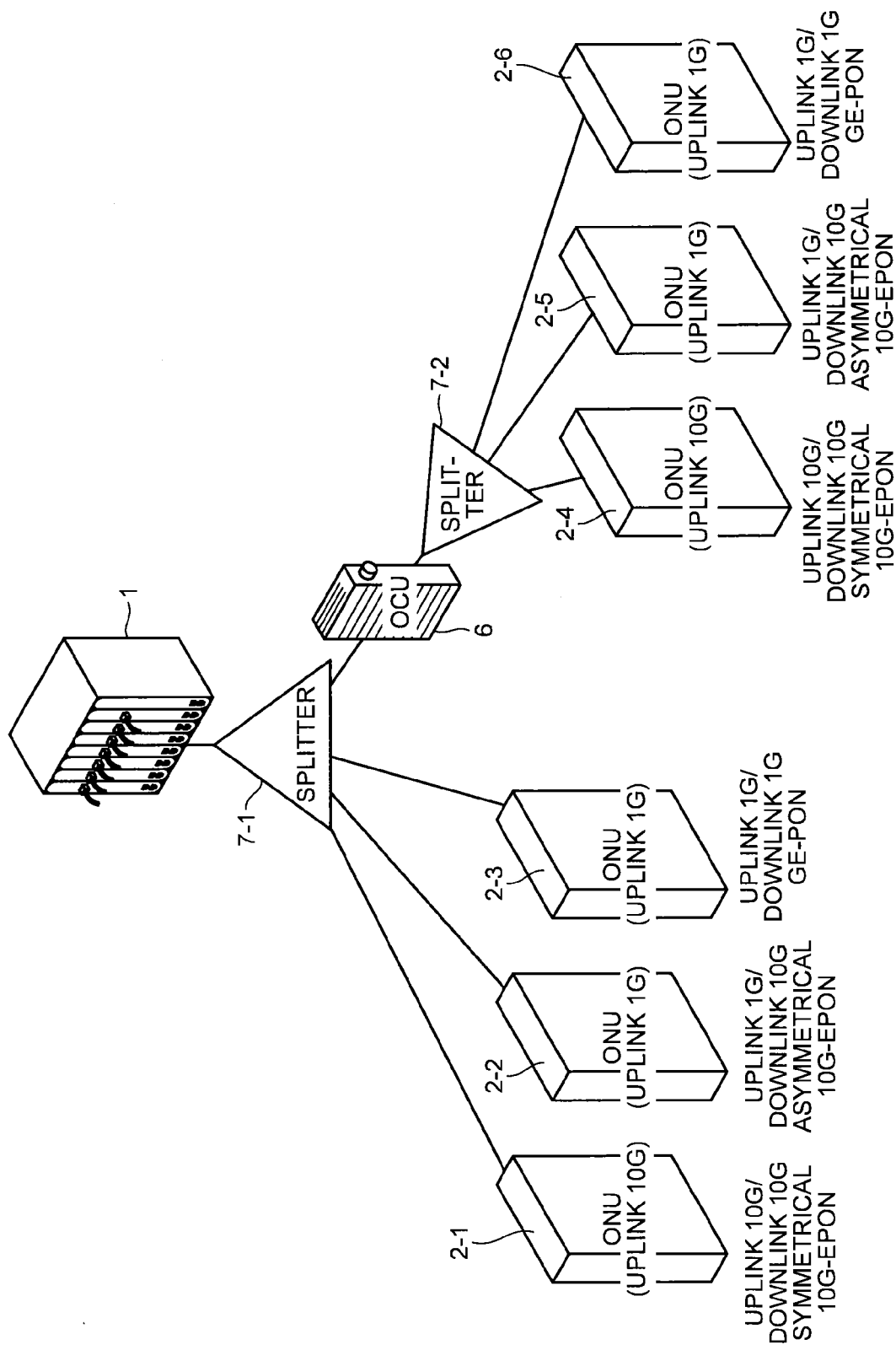
FIG. 4 is a logical topology diagram of the communication system according to the first embodiment.

Bandwidth allocation according to the present embodiment is explained next. FIG. 4 is a logical topology diagram of a relation of connection between the ONUs 2-1 to 2-3 directly connected to the OLT 1 and the ONUs 2-4 to 2-6 connected to the OLT 1 via the OCU 6. For example, the splitters 7-1 and 7-2 are the closure 5 shown in FIG. 1.

As an example, it is assumed here that the ONUs 2-1 and 2-4 correspond to a symmetrical 10 G-EPON (the same communication speed in the uplink and downlink) having uplink and downlink communication speeds of 10 G, the ONUs 2-2 and 2-5 correspond to an asymmetrical 10 G-EPON (different communication speeds in the uplink and downlink) having an uplink communication speed of 1 G and a downlink communication speed of 10 G, and the ONUs 2-3 and 2-6 correspond to a GE-PON having uplink and downlink communication speeds of 1 G.

In the present embodiment, as shown in FIG. 4, when there are ONUs 2-1 to 2-6 having different uplink communication speeds are present in a mixed manner, as described above, the OCU 6 stores data transferred at a low speed (the 1 G communication speed) in the buffer 19 once and converts the data to a high-speed optical signal (the 10 G communication speed), and transmits the optical signal to the OLT 1. Accordingly, the OCU 6 needs to ascertain the communication speed of the ONUs 2-4 to 2-6 under control thereof. The OCU 6 needs to ascertain information whether it is a time period for receiving a 1 G uplink optical signal or receiving a 10 G uplink optical signal. In the present embodiment, the OCU 6 acquires these pieces of information based on the gate frame analysis for analyzing a gate frame (bandwidth allocation notification) transmitted from the OLT 1 to the ONUs 2-4 to 2-6. The gate frame analysis according to the present embodiment is explained below.

Figure 5:
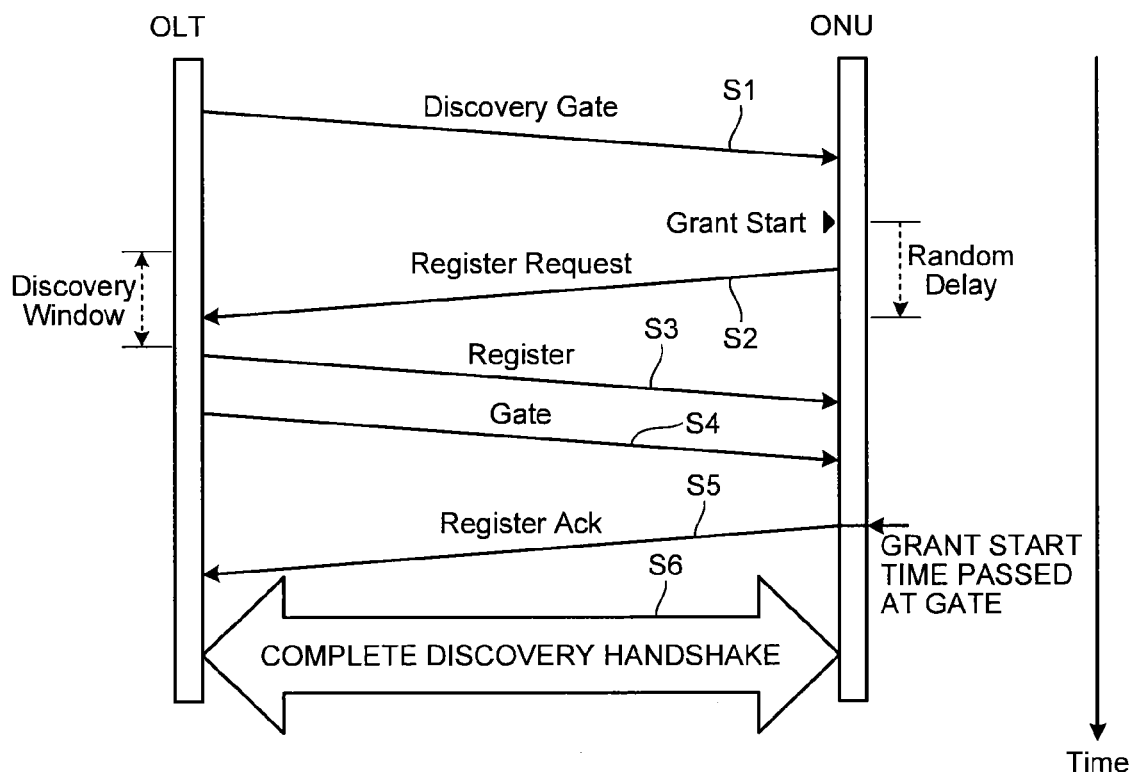
FIG. 5 is a sequence diagram of an example of a message exchanging procedure of Discovery Handshake.

FIG. 5 is a sequence diagram of an example of a message exchanging procedure of Discovery Handshake performed between the OLT 1 and the ONUs 2-4 to 2-6. FIG. 5 depicts the procedure of the Discovery Handshake specified by the IEEE (the Institute of Electrical and Electronics Engineers) 802.3ay.

As shown in FIG. 5, the OLT 1 transmits a discovery gate frame (Discovery Gate) to the ONUs 2-1 to 2-6 (Step S1), similarly to a conventional PON system. Upon reception of the discovery gate frame, the ONUs 2-1 to 2-6 respectively transmit a register request frame (Register Request) to the OLT 1 (Step S2). The discovery gate frame is transmitted by broadcasting. The respective ONUs 2-1 to 2-6 transmit the register request frame after a random time (within a range of a transmission permitted time period) since a start time of a transmission permitted time period (Grant Start time) specified by the discovery gate frame.

Figure 6:
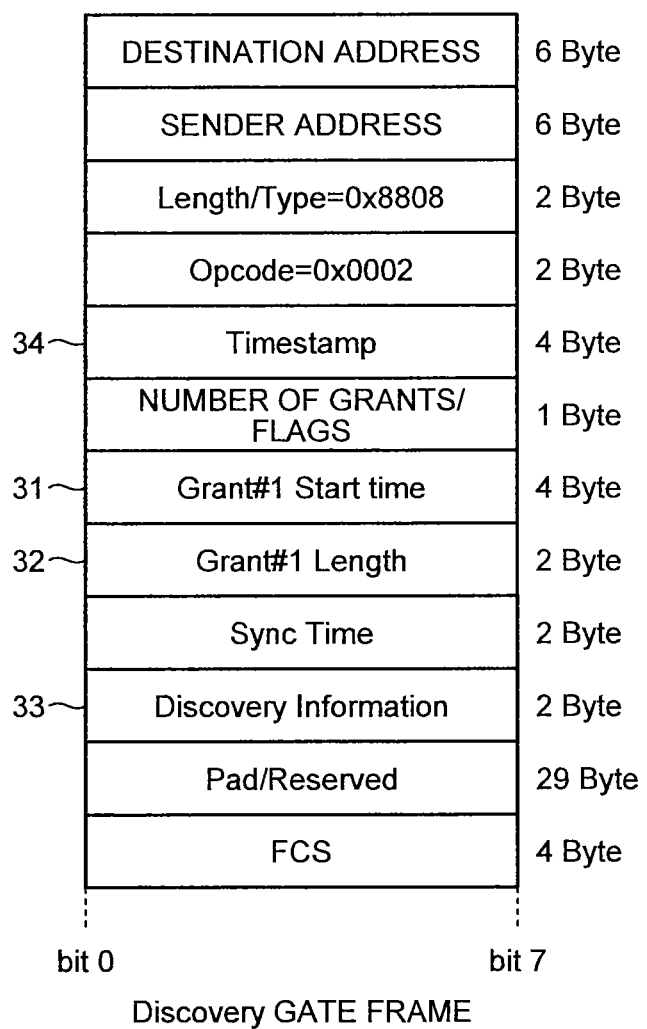
FIG. 6 depicts a format of a discovery gate frame.

FIG. 6 depicts a format of the discovery gate frame. FIG. 7 depicts bit assignment in a discovery information field of the discovery gate frame. FIG. 8 depicts a format of the register request frame.

As shown in FIG. 6, a Grant #1 Start time 31 (a start time of the transmission permitted time period) notifying the transmission permitted time period and a Grant #1 Length 32 (a length of the transmission time period) are stored in the discovery gate frame, thereby enabling to specify the transmission permitted time period. FIG. 7 depicts a content of the discovery information field (Discovery Information) 33 of the discovery gate frame.

As shown in FIG. 7, in the discovery information field 33, Bit 0 indicates whether the OLT 1 can handle an uplink 1 G signal, and Bit 1 indicates whether the OLT 1 can handle an uplink 10 G signal. Furthermore, in conjunction with these bit states, bit states of Bit 4 and Bit 5 are determined. When the OLT 1 can handle both the uplink 1 G and 10 G signals, by notifying a discovery time (a time for accepting the register request frame) of the ONU corresponding to uplink 1 G and a discovery time of the ONU corresponding to uplink 10 G separately, it can be avoided that two types of signals overlap within the same time period. In FIG. 7, a Grant #1 is described. However, because a plurality of Grants can be specified, for example, the time period can be divided and specified for the Grant #1 and a Grant #2.

With the above configuration, the OCU 6 that relays signals transmitted and received between the OLT 1 and the ONUs 2-4 to 2-6 analyzes the content of the discovery gate frame (gate frame analysis), thereby enabling to ascertain a time period having a possibility that a 1 G signal is transmitted from the ONUs 2-4 to 2-6 to the OLT 1 (an uplink 1 G transmission time period) and a time period having a possibility that a 10 G signal is transmitted from the ONUs 2-4 to 2-6 to the OLT 1 (an uplink 10 G transmission time period). Specifically, the 10 G ONUMAC 201 ascertains the uplink 1 G transmission time period and the uplink 10 G transmission time period. The 10 G ONUMAC 201 notifies the control unit 23 of the uplink 1 G transmission time period and the uplink 10 G transmission time period. The control unit 23 instructs the uplink-signal selection unit 17 to set the AMP 22 as the output destination in the uplink 10 G transmission time period and set the uplink 1 G Rx 18 as the output destination in the uplink 1 G transmission time period based on the notified information.

Returning to the explanation of FIG. 5, upon reception of the register request frame, the OLT 1 returns a register frame (Register) as a response thereto (Step S3), and transmits a normal gate frame for notifying the transmission permitted time period (Step S4). The register frame and the gate frame are transmitted to the ONUs 2-1 to 2-6; however, because an LLID (Logical Link Identifier) of the destination is specified, the device that has received the frame can ascertain to which ONU the gate frame is transmitted. The ONUs 2-1 to 2-6 having received the gate frame corresponding to the LLID of its own unit transmit a response frame (Register Ack) with respect to the register frame within the transmission permitted time period notified by the gate frame (Step S5), to complete the Discovery Handshake (Step S6).

Figure 9:
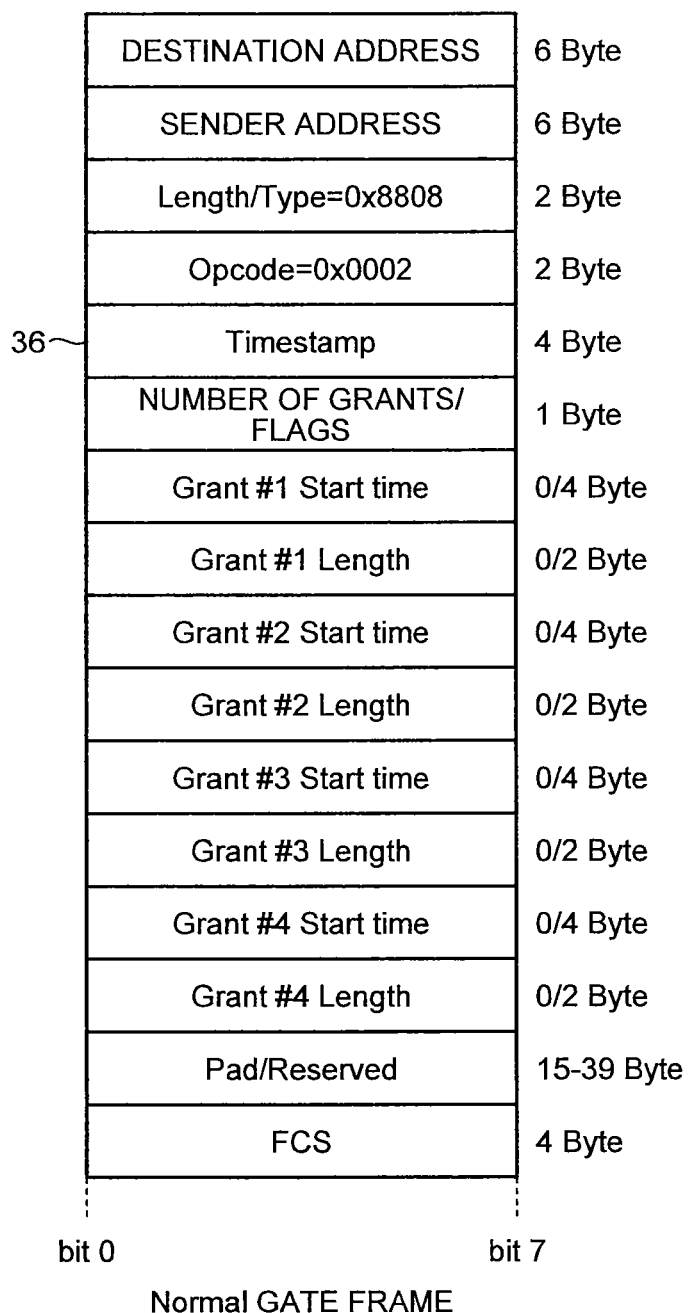
FIG. 9 depicts a format of a normal gate frame.

FIG. 9 depicts a format of a normal gate frame (Normal Gate). Information specifying the transmission permitted time period such as the Grant #1 Start time and the Grant #1 Length is stored in the normal gate frame as in the discovery gate frame. The OCU 6 that relays signals transmitted and received between the OLT 1 and the ONUs 2-4 to 2-6 analyzes the content of the gate frame (gate frame analysis), and can ascertain the transmission permitted time period for each destination of the gate frame. It is assumed here that the OCU 6 holds the communication speed of the uplink signal (whether it is 1 G or 10 G) for each of the ONUs 2-4 to 2-6 under control thereof beforehand. It is also assumed that the OCU 6 ascertains the correspondence between the LLID and each of the ONUs 2-4 to 2-6.

The 10 G ONUMAC 201 of the OCU 6 acquires the uplink 10 G transmission time period or the uplink 1 G transmission time period for each gate frame based on the held communication speed of each of the ONUs 2-4 to 2-6, the destination of the gate frame and the transmission permitted time period, and correspondence between the LLID and the ONU, and notifies the control unit 23 of these pieces of information. When the uplink 10 G transmission time period is notified, the control unit 23 instructs the uplink-signal selection unit 17 to set the AMP 22 as the output destination during the time period. When the uplink 1 G transmission time period is notified, the control unit 23 instructs the uplink-signal selection unit 17 to set the uplink 1 G Rx 18 as the output destination during the time period.

The 10 G ONUMAC 201 can notify the control unit 23 of the destination of the gate frame and the transmission permitted time period without acquiring the uplink 10 G transmission time period or the uplink 1 G transmission time period, and the control unit 23 can acquire the uplink 10 G transmission time period or the uplink 1 G transmission time period based on the communication speed held therein of each of the ONUs 2-4 to 2-6, the destination of the gate frame and the transmission permitted time period, and the correspondence between the LLID and the ONU.

In the present embodiment, it is assumed that the OCU 6 can ascertain all the transmission permitted time periods of the ONUs 2-4 to 2-6 under control thereof by analyzing the gate frame transmitted by the downlink 10 G. However, when it is required to analyze the gate frame transmitted by the downlink 1 G, a function of analyzing the gate frame transmitted by the downlink 1 G can be added in the same manner.

An operation of the OCU 6 with respect to data after completion of the Discovery Handshake is explained next. After the Discovery Handshake is complete, when there is transmission data, the ONUs 2-1 to 2-6 notify the OLT 1 of an amount of data for which transmission is requested by a report frame (a bandwidth allocation request). The OLT 1 allocates the transmission permitted time period respectively to the ONUs 2-1 to 2-6 by, for example, DBA (Dynamic Bandwidth Allocation) based on the report frame transmitted from the ONUs 2-1 to 2-6. The transmission permitted time period is allocated for each LLID in practice. However, to simplify explanations, it is assumed that one ONU corresponds to one LLID. A bandwidth allocation method in the OLT 1 according to the present embodiment is described later.

After completion of the Discovery Handshake, when there is the transmission data, the ONUs 2-1 to 2-6 under control of the OCU 6 transmit the uplink transmission data and the report frame as an optical signal having a communication speed of 1 G (uplink 1 G signal) or an optical signal having a communication speed of 10 G (uplink 10 G signal) to the OLT 1 in the transmission permitted time period specified by the gate frame. The operations of the ONUs 2-4 to 2-6 are the same as those in conventional techniques.

Upon reception of the uplink 1 G signal or uplink 10 G signal transmitted from the ONUs 2-4 to 2-6 under control of the OCU 6 to the OLT 1, the uplink-signal selection unit 17 in the OCU 6 outputs the uplink 1 G signal to the uplink 1 G Rx 18 and outputs the uplink 10 G signal to the AMP 22 based on the instruction from the control unit 23. The uplink 10 G signal output to the AMP 22 is amplified and transmitted to the OLT 1 via the WDM 11.

The uplink 1 G signal output to the uplink 1 G Rx 18 is stored in the buffer 19 via the 1 G Burst Rx 181 and the 1 G OLTMAC 182. In the present embodiment, the OCU 6 also requests bandwidth allocation for the uplink communication to the OLT 1 by the report frame. The OCU 6 transmits data accumulated in the buffer 19 as the uplink 10 G signal in the transmission permitted time period stored in the gate frame transmitted from the OLT 1 to the OCU 6.

In the PON system, the OLT performs bandwidth allocation for each of predetermined bandwidth update cycles for uplink and downlink communications between each ONU and the OLT. However, at this time, the OLT needs to perform bandwidth allocation to respective ONUs so that the transmission permitted times allocated for the uplink communication do not overlap. Because the transfer lines between the OLT and each ONU are different, the OLT measures a frame round-trip time (RTT: Round Trip Time) between the OLT and each ONU, and uses the measured RTT to perform bandwidth allocation.

Specifically, for example, the OLT holds the transmission time of the discovery gate frame. The ONU obtains the RTT based on a reception time at which the register request frame, which is a response to the discovery gate frame, has been received, and the held transmission time. The transmission time of the normal gate frame is held as well to obtain the RTT in the same manner based on a reception time at which the report frame transmitted from the ONU has been received and the held transmission time. The frame used for measurement of the RTT is not limited to these frames.

Meanwhile, in the present embodiment, the uplink 1 G signal is once stored in the buffer 19 and transmitted. Therefore, when the RTT is measured by OLT1 in the normal manner, because a residence time in the buffer 19 of the OCU 6 is added, the correct RTT cannot be calculated. Therefore, in the present embodiment, time stamps of the register request frame and the report frame are rewritten so that the correct RTT can be calculated.

Figure 10:
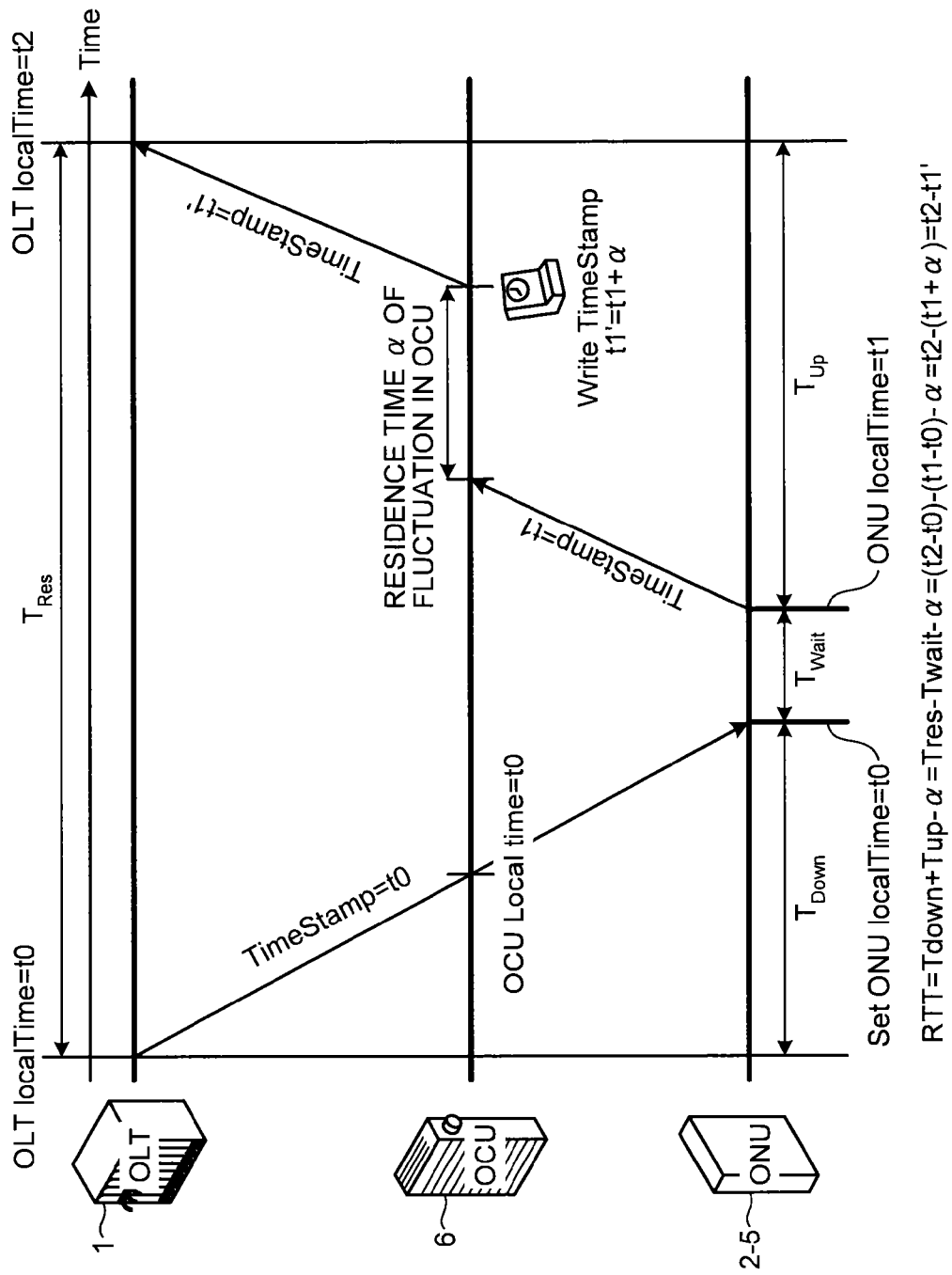
FIG. 10 is an example of an RTT calculating procedure according to the first embodiment.
Figure 11:
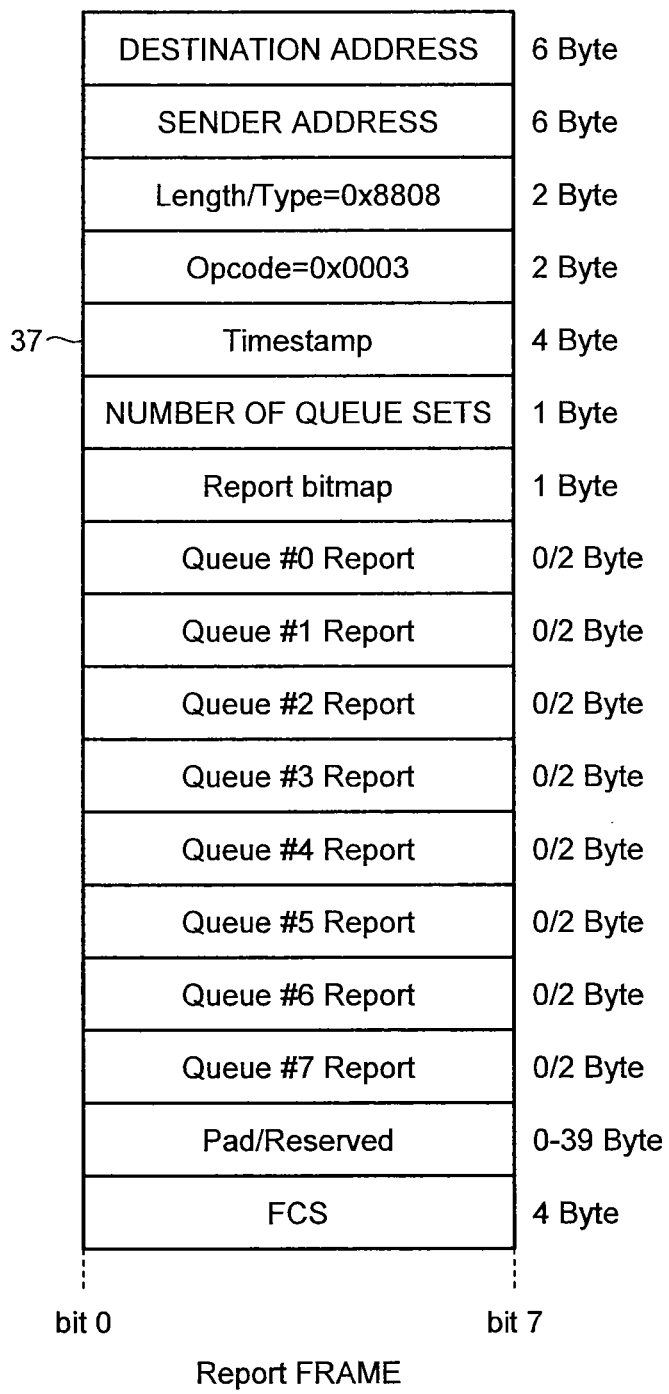
FIG. 11 depicts a format of a report frame.

FIG. 10 is an example of an RTT calculating procedure according to the present embodiment. FIG. 11 depicts a format of the report frame. The OLT 1 first transmits the discovery gate frame or gate frame to the ONU 2-5. In FIG. 11, the ONU 2-5 is described as an example; however, the same applies to the ONU 2-6. Because the ONU 2-4 transmits the uplink 10 G signal, the residence time in the OCU 6 is not a problem between the OLT 1 and the ONU 2-4, and the RTT measurement method between the OLT 1 and the ONU 2-4 is the same as that in conventional techniques. At this time, a transmission time t0 of the frame in the OLT 1 is stored as a time stamp in the discovery gate frame or gate frame (a Timestamp 34 in FIG. 6 or a Timestamp 35 in FIG. 8).

The OCU 6 sets the local time of its own unit to the time stamp value t0 stored in the discovery gate frame or gate frame received from the OLT 1, and transmits the received frame to the ONU 2-5. Specifically, after the AMP 12 amplifies the frame (a discovery gate frame or a gate frame) received as an optical signal via the WDM 11, the splitter 13 branches the optical signal into two optical signals. The OCU 6 transmits one of the branched optical signals to the ONU 2-5 via the WDM 16. Furthermore, the other one of the branched optical signals is received by the 10 G ONUMAC 201 via the WDM 14 and the downlink 10 G Rx 21, and the 10 G ONUMAC 201 analyzes the received frame and sets the local time of its own unit to the time stamp value to.

Upon reception of the frame (a discovery gate frame or a gate frame), the ONU 2-4 sets the local time of its own unit to the time stamp value t0 stored in the received frame, and transmits a response frame (a register request frame or a report frame) after a delay time $T_{wait}$ in the ONU 2-4. At this time, a transmission time t1 of the frame is stored in the time stamp (a Timestamp 36 in FIG. 9 or a Timestamp 37 in FIG. 11) of the response frame.

Upon reception of the response frame from the ONU 2-5, the OCU 6 stores the frame in the buffer 19, and reads and transmits the frame in the transmission permitted time period allocated to its own unit. Therefore, the residence time in the OCU 6 of the response frame fluctuates. In the OCU 6, to eliminate the influence of the residence time on the measurement of the RTT, the 10 G ONUMAC 201 obtains a difference between the reception time of the response frame and the transmission time of the frame as a residence time α, rewrites the time stamp from t1 to t1'=t1+α at the time of transmission of the frame.

The OLT 1 acquires a reception time t2 at which the response frame to the frame has been received, to calculate the RTT based on t2 and t1' stored in the response frame. $T_{down}$ denotes a downlink communication time, $T_{up}$ denotes an uplink communication time, and $T_{res}$ denotes a time (t2−t0) since the discovery gate frame or gate frame is transmitted by the OLT 1 until the response frame is received.

$$RTT = T_{down} + T_{up} - \alpha = T_{res} - T_{wait} - \alpha = (t2-t0) - (t1-t0) - \alpha = t2 - (t1+\alpha) = t2 - t1' \quad (1)$$

When the OLT 1 measures the RTT by a frame other than the discovery gate frame or gate frame, the time stamp is stored in each frame in the similar manner, and the OCU 6 rewrites the time stamp of the frame transmitted from the ONU 2-5 to a value added by the residence time α. The RTT calculation method described above is only an example, and any calculation method can be used as long as the method can correct the residence time in the OCU 6.

Figure 12:
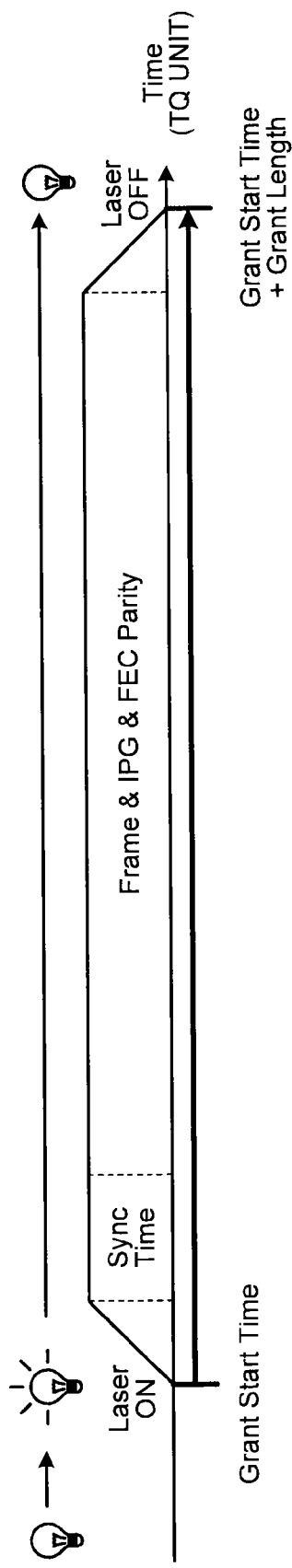
FIG. 12 is an example of a format of uplink burst transmission.

A bandwidth allocation method in the OLT 1 according to the present embodiment is explained next. FIG. 12 is an example of a format of uplink burst transmission. As shown in FIG. 12, each of the ONUs 2-1 to 2-6 transmits an uplink signal in a transmission permitted time period permitted to its own unit by the gate frame (between the Grant Start Time and the Grant Start Time+the Grant Length).

For example, the ONUs 2-1 to 2-6 start illumination by turning on a laser for transmitting an optical signal at the Grant Start Time. After a synchronization time (Sync Time), the ONUs 2-1 to 2-6 transmit data (Preamble, Frame, IPG (Inter Packet Gap), FEC (Forward Error Correction) Parity), and turn off the laser to stop illumination by the Grant Start Time+the Grant Length.

In the normal PON system, the OLT allocates the transmission permitted time so that the time during which each ONU under control thereof illuminates light does not overlap on each other. In the present embodiment, the OLT divides the ONUs 2-1 to 2-6 under control thereof into two groups, that is, the ONUs 2-1 to 2-3 connected to the OLT without via the OCU 6 and the ONUs 2-4 to 2-6 connected to the OLT via the OCU 6. The ONUs 2-5 and 2-6 that transmit the uplink 1 G signals, of the ONUs 2-4 to 2-6 connected to the OLT via the OCU 6, are allowed to illuminate light simultaneously with the ONUs 2-1 to 2-3 connected to the OLT without via the OCU 6.

Figure 13:
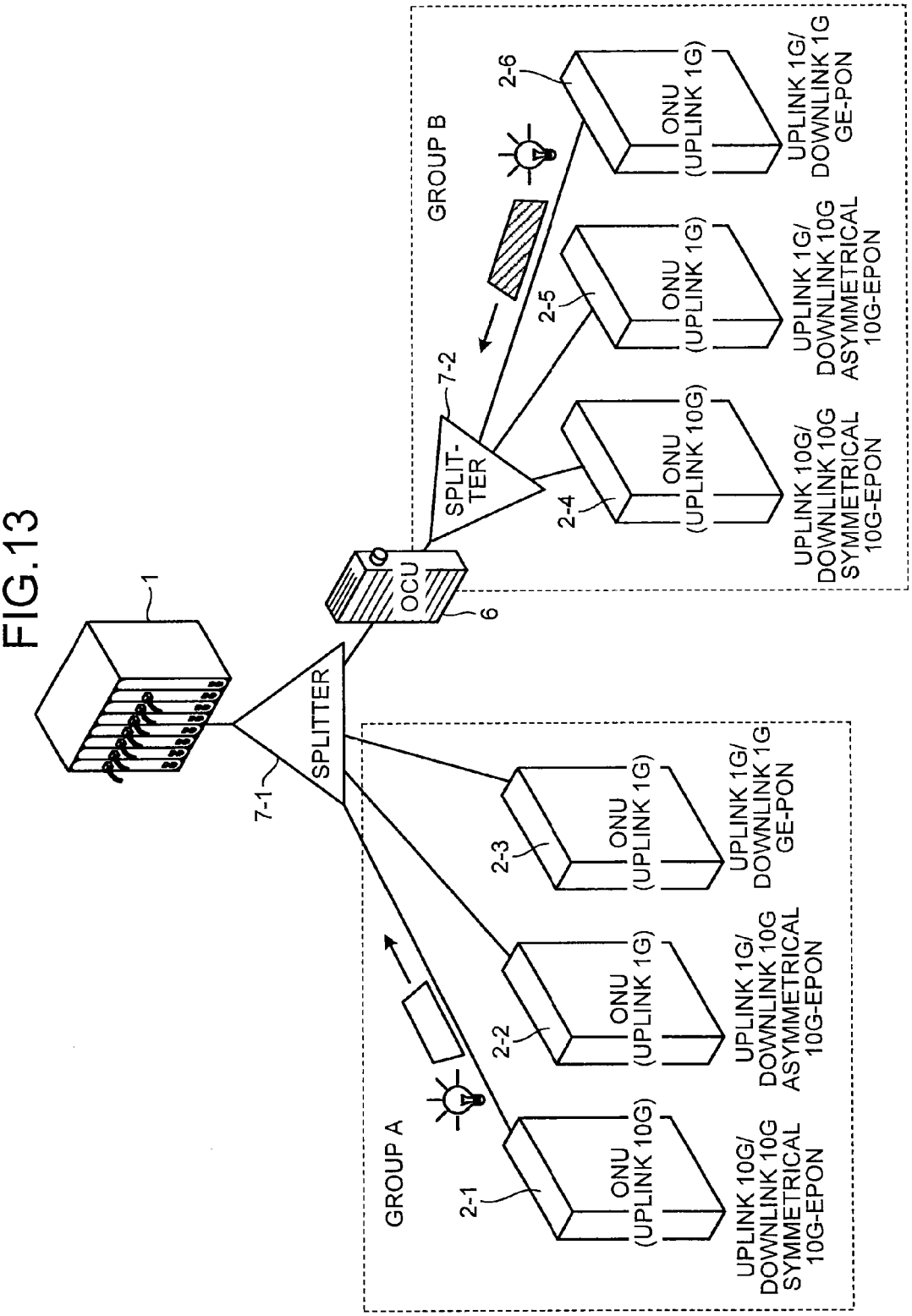
FIG. 13 is an example of grouping of ONUs 2-1 to 2-6 according to the first embodiment and depicts a state of simultaneous illumination.

FIG. 13 is an example of grouping of the ONUs 2-1 to 2-6 according to the present embodiment and depicts a state of simultaneous illumination. The communication system in FIG. 13 is the same as the communication system shown in FIG. 4, and the ONUs 2-1 to 2-3 connected to the OLT 1 without via the OCU 6 are designated as a group A, and the ONUs 2-4 to 2-6 connected to the OLT 1 via the OCU 6 are designated as a group B. The ONU 2-6 of the group B and the ONU 2-1 of the group A simultaneously illuminate light (that is, the transmission permitted time periods thereof overlap on each other). The uplink 1 G signals transmitted from the ONUs 2-5 and 2-6 of the group B are once stored in the buffer 19 of the OCU 6 and then transmitted from the OCU 6 to the OLT 1. Therefore, if the transmission permitted time periods of the ONUs 2-4 to 2-6 do not overlap on each other, and the transmission time period from the OCU 6 to the OLT 1 and the transmission time periods of the ONUs 2-1 to 2-3 in the Group A do not overlap on each other, an overlapping problem of the signals does not occur.

Figure 14:
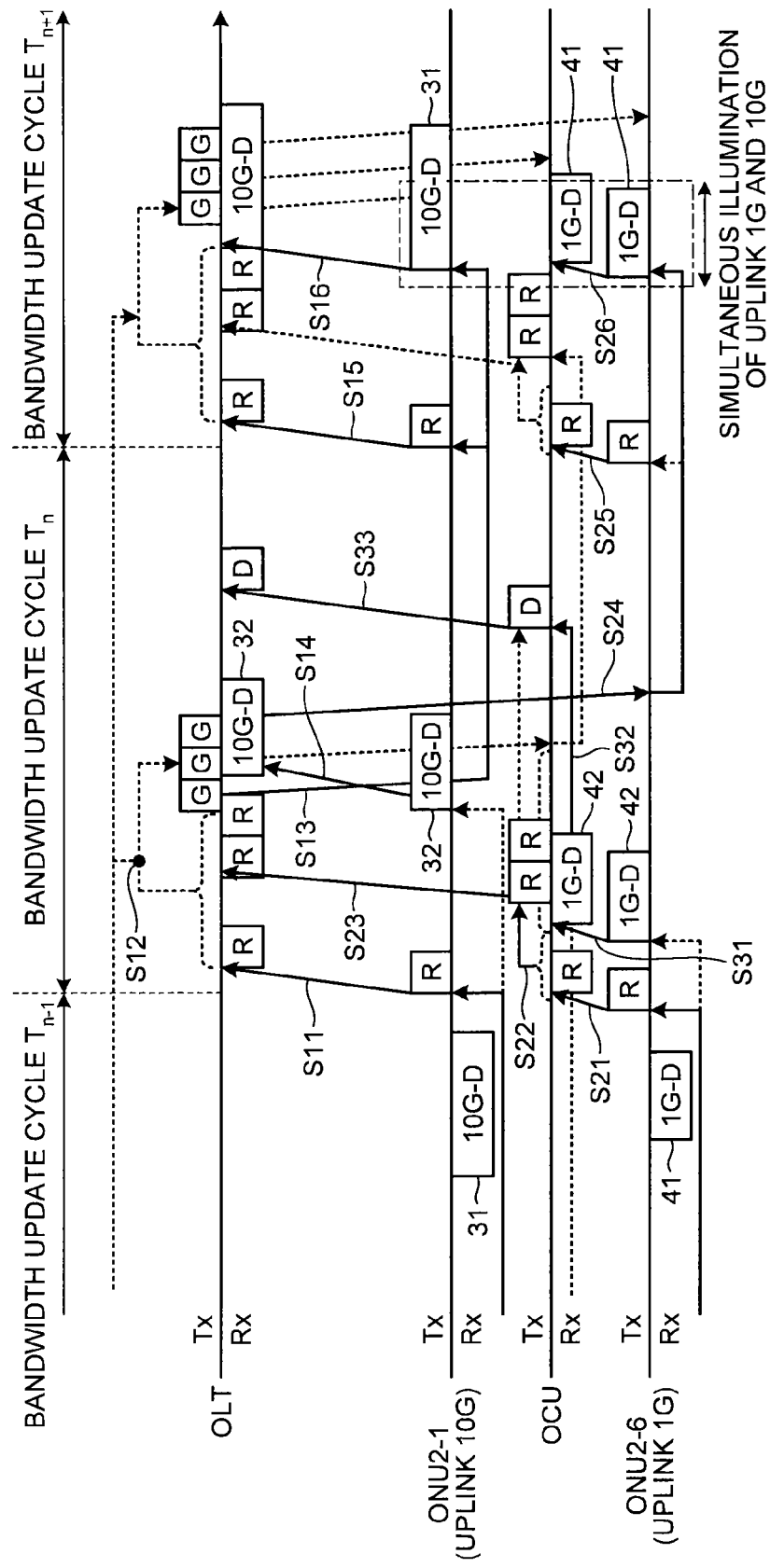
FIG. 14 depicts a state of frame transfer when transmission time periods of the ONUs 2-1 and 2-6 overlap on each other.

FIG. 14 depicts a state of frame transfer when the transmission time periods of the ONUs 2-1 and 2-6 overlap on each other. When pieces of data (10 G-D 31) received from a user device or the like connected thereto are accumulated, the ONU 2-1 transmits a report frame (described as R in FIG. 14) having stored therein an amount of data requested to the OLT 1 in the transmission permitted time period instructed by a gate frame (not shown) in a bandwidth update cycle (a bandwidth update cycle $T_{n-1}$) just before a current bandwidth update cycle ($T_n$) (Step S11). The OLT 1 performs bandwidth allocation in the next bandwidth update cycle (a bandwidth update cycle $T_{n+1}$), based on the received report from each of the ONUs 2-1 to 2-6 within the bandwidth update cycle (a bandwidth update cycle $T_n$) (Step S12), and notifies the ONU 2-1 of an allocation result (a transmission permitted time period) by a gate frame (described as G in FIG. 14) (Step S13). Furthermore, the ONU 2-1 transmits data (10 G-D 32) to the OLT 1 in the transmission permitted time period instructed by the gate frame (not shown) in the bandwidth update cycle $T_{n-1}$ (Step S14). The ONU 2-1 having received the gate frame transmits a report frame in the transmission permitted time period in the bandwidth update cycle $T_{n+1}$ instructed by the gate frame (Step S15), and transmits the 10 G-D to the OLT 1 (Step S16).

Meanwhile, when data (1 G-D 41) is accumulated in its own unit, the ONU 2-6 transmits a report frame having stored therein an amount of data for which transmission is requested to the OCU 6 in the transmission permitted time period instructed by the gate frame (not shown) in the bandwidth update cycle $T_{n-1}$ (Step S21). The report frame is once stored in the buffer 19 in the OCU 6 (Step S22). The OCU 6 then transmits the report frame accumulated in the buffer 19 in the transmission permitted time period instructed by the gate frame (not shown) in the bandwidth update cycle $T_{n-1}$ (Step S23). The OLT 1 performs bandwidth allocation in the bandwidth update cycle $T_{n+1}$ based on the report received from each of the ONUs 2-1 to 2-6 in the bandwidth update cycle $T_n$, (Step S12), and notifies the ONU 2-6 of the allocation result (a transmission permitted time period) by the gate frame (Step S24).

The ONU 2-6 transmits a report frame having stored therein an amount of data for which transmission is requested to the OCU 6 in the transmission permitted time period in the bandwidth update cycle $T_{n+1}$ instructed by the notified gate frame (Step S25), and transmits data (the 1 G-D 41) to the OCU 6 (Step S26).

The ONU 2-6 also transmits to the OCU 6 data (1 G-D 42) for which transmission is requested by a report frame transmitted in the bandwidth update cycle $T_{n-1}$ in the transmission permitted time period instructed by the gate frame (not shown) in the bandwidth update cycle $T_{n-1}$ (Step S31). The data (the 1 G-D 42) is once stored in the buffer 19 with the report frame in the OCU 6 (Step S32). The OCU 6 transmits data (1 G-D42) accumulated in the buffer 19 in the transmission permitted time period instructed by the gate frame (not shown) in the bandwidth update cycle $T_{n-1}$ (Step S33).

In an example shown in FIG. 14, in the bandwidth update cycle $T_{n+1}$, there is a time period in which the ONUs 2-1 and 2-6 illuminate light simultaneously (a time period in which data is transmitted simultaneously). However, because data of the ONU 2-6 is once stored in the buffer 19 and then transmitted, a signal overlapping problem does not occur.

In the example shown in FIG. 14, the OCU 6 transmits data to the OLT 1 in the bandwidth update cycle in which the data has been received from the ONU 2-6. The OLT 1 needs to allocate the transmission permitted time period to the OCU 6 in the bandwidth update cycle just before the current bandwidth update cycle. Regarding the report frame, because the amount of data is constant, allocation can be regularly performed for each bandwidth update cycle. However, regarding the uplink data, the amount of data fluctuates. Therefore, the OCU 6 stores the amount of data to be transmitted in the next bandwidth update cycle as a predicted value and transmits the predicted value in the report frame to be transmitted in the bandwidth update cycle just before the current bandwidth update cycle. The predicted value can be obtained by any method. For example, data accumulated at the point of the report frame can be used as the predicted value, or a certain amount of margin can be added to the accumulated data and used as the predicted value.

Alternatively, the OLT 1 can ascertain the amount of data presumed to be accumulated in the OCU 6 in the cycle based on the report frame transmitted from the ONUs 2-5 and 2-6 that perform uplink 1 G transfer under control of the OCU 6. That is, for example, the OLT 1 handles the total amount of data requested by the report frame transmitted from the ONUs 2-5 and 2-6 received in the bandwidth update cycle $T_{ii}$ as the amount of data requested from the OCU 6.

When the OCU 6 transmits the data to the OLT 1 in the bandwidth update cycle subsequent to the bandwidth update cycle at which the data has been received from the ONU 2-6, the OCU 6 only needs to send the accumulated data to the OLT 1 by the report frame in the same way as the ONUs 2-1 to 2-6.

Figure 15:
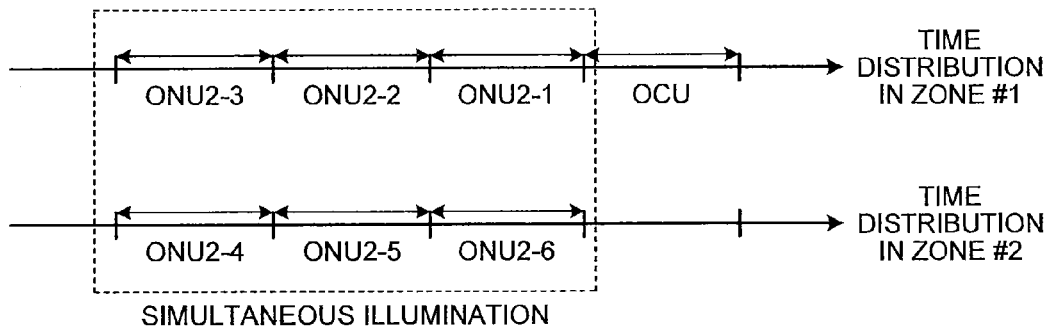
FIG. 15 is an example of a result of performing bandwidth allocation.

FIG. 15 is an example of a result of performing bandwidth allocation to the ONUs 2-1 to 2-6 and the OCU 6 by the OLT 1. In the present embodiment, the ONUs 2-1 to 2-6 are divided into two groups as described above. The OLT 1 performs allocation of the bandwidth update cycle to the group A and the OCU 6 as the bandwidth allocation of a zone #1. Furthermore, the OLT 1 allocates the transmission permitted time period to the ONUs 2-4 to 2-6 in the group B before the transmission permitted time period allocated to the OCU 6 in the bandwidth update cycle so as not to overlap on the transmission permitted time period allocated to the OCU 6, as the bandwidth allocation of a zone #2. The OLT 1 performs bandwidth allocation, respectively, to the report frame and data in this manner.

In FIG. 15, the OLT 1 allocates the bandwidth so that the transmission permitted time period of the OCU 6 becomes the last. This is because the report frame or the data received from the ONUs 2-5 and 2-6 can be transmitted in the same bandwidth update cycle as that for the reception. However, an order of allocating the bandwidth by the OLT 1 to the respective devices is not limited to the example shown in FIG. 15. For example, when the OCU 6 transmits the report frame or data received from the ONUs 2-5 and 2-6 after the bandwidth update cycle subsequent to the bandwidth update cycle in which the report frame or data has been received, the transmission permitted time period of the OCU 6 can be the top.

Furthermore, in FIG. 15, the zone #2 is set as a time period of the zone #1 excluding the transmission permitted time period allocated to the OCU 6. However, when there is no such a limitation that the report frame or data received from the ONUs 2-5 and 2-6 needs to be transmitted in the same bandwidth update cycle as that for the reception, the zone #2 can overlap on the transmission permitted time period allocated to the OCU 6.

As long as the transmission permitted time periods of the ONUs 2-1 to 2-3 do not overlap on each other, the transmission permitted time periods of the ONUs 2-4 to 2-6 do not overlap on each other, the transmission permitted time period of the ONU 6 does not overlap on the transmission permitted time periods of the ONUs 2-1 to 2-3, and the transmission permitted time period of the ONU 6 does not overlap on that of the ONU (the ONU 2-4) under control thereof that performs uplink 10 G transfer, any type of bandwidth allocation can be performed.

Figure 16:
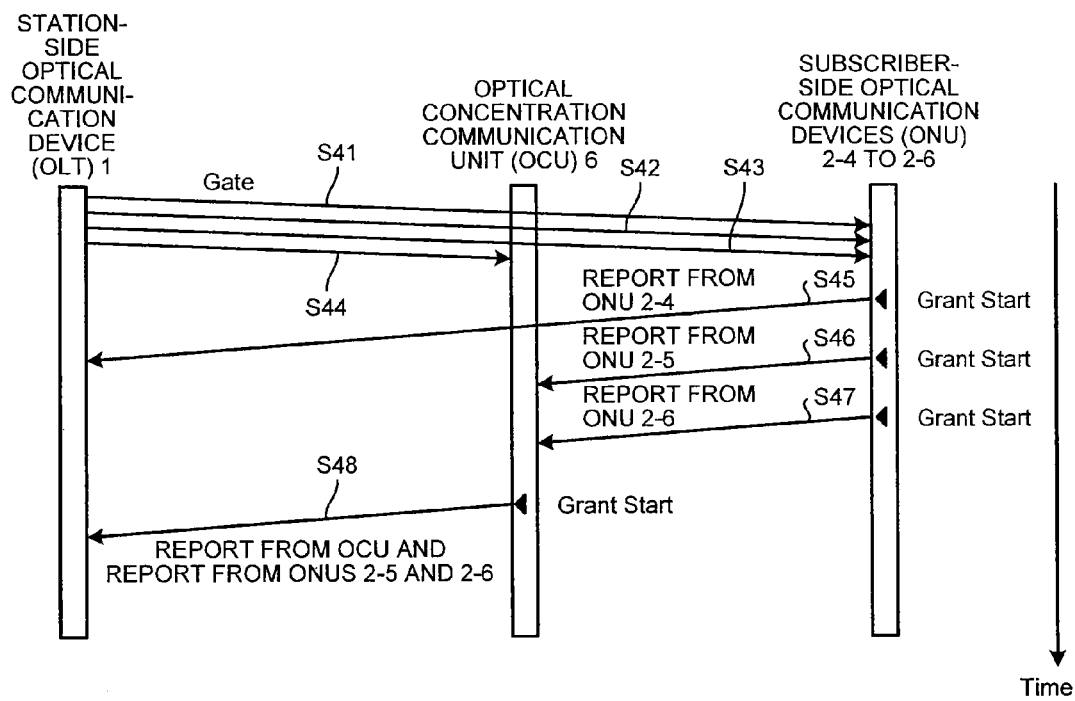
FIG. 16 is a chart of an example of a transferring procedure of a report frame and a gate frame according to the first embodiment.

FIG. 16 is a chart of an example of a transferring procedure of the report frame and the gate frame according to the present embodiment. FIG. 16 depicts the transferring procedure between the OCU 6 and the ONUs 2-4 to 2-6 under control of the OCU 6. The transferring procedure related to the ONUs 2-1 to 2-3 is same as that in conventional techniques.

The OLT 1 transmits the gate frame to the OCU 6 and the ONUs 2-4 to 2-6 (Steps S41 to S44). The ONU 2-4 transmits the report frame in the transmission permitted time period permitted to its own unit by the gate frame (Step S45). Because the report frame received from the ONU 2-4 is an uplink 10 G signal, the OCU 6 amplifies the report frame and transfers the report frame to the OLT 1 as it is.

Each of the ONUs 2-5 and 2-6 transmits the report frame in the transmission permitted time period permitted to its own unit by the gate frame (Steps S46 and S47). Because the report frames received from the ONUs 2-5 and 2-6 are uplink 1 G signals, the OCU 6 once stores the report frames in the buffer 19, and transmits the report frames stored in the buffer 19 with its own report frame as an uplink 10 G signal to the OLT 1 in the transmission permitted time period permitted to its own unit by the gate frame (Step S48).

Figure 17:
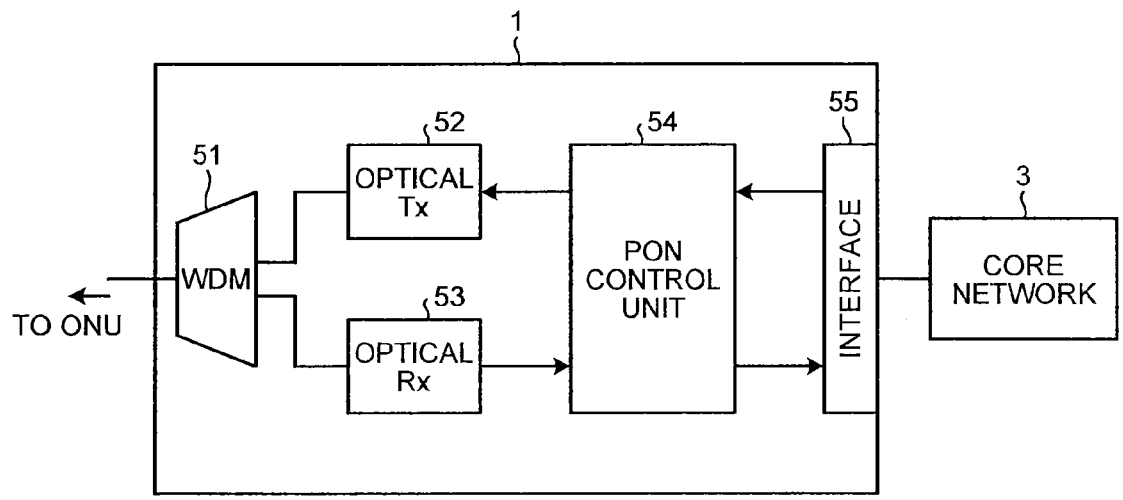
FIG. 17 is a functional configuration example of an OLT according to the first embodiment.

FIG. 17 is a functional configuration example of the OLT 1 according to the present embodiment. Uplink signals transmitted from the ONUs 2-1 to 2-4 and an uplink signal transmitted from the OCU 6 pass through a WDM 51 and are converted to electric signals by an optical Rx (optical receiver) 53, and input to a PON control unit (bandwidth allocation unit) 54. Data of the uplink signals to be transmitted to the core network 3 is transmitted to the core network 3 via an interface 55, and a signal addressed to the OLT 1 (such as a report frame) is processed by the PON control unit 54.

Downlink signals addressed to the ONUs 2-1 to 2-6 transmitted from the core network pass through the interface 55, and are transmitted by the PON control unit 54 to the respective ONUs 2-1 to 2-6 via an optical Tx (optical transmitter) 52 and the WDM 51. The PON control unit 54 performs control in the PON system such as bandwidth allocation based on the received report frame, and generates a gate frame for sending a bandwidth allocation result to transmit the gate frame to the respective ONUs 2-1 to 2-6 and the OCU 6 via the optical Tx (optical transmitter) 52 and the WDM 51.

Figure 18:
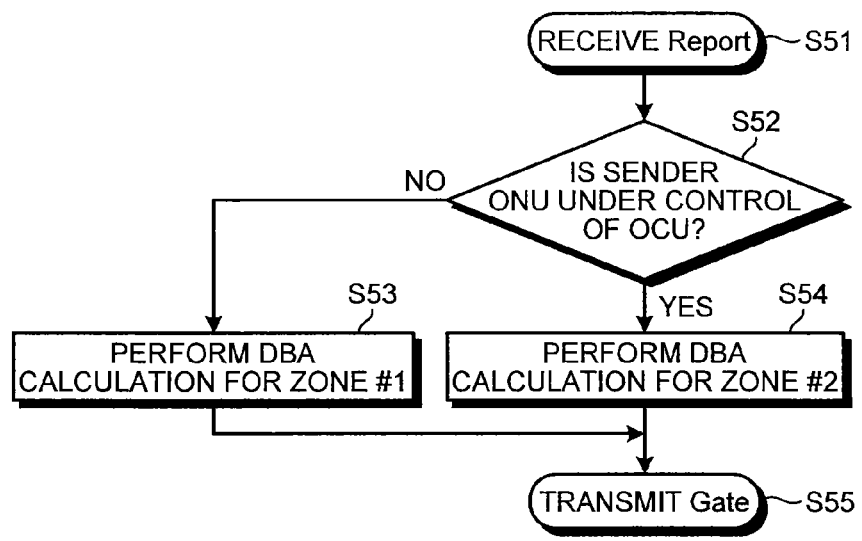
FIG. 18 is an example of a processing procedure from reception of a report frame to transmission of a gate frame in the OLT according to the first embodiment.

FIG. 18 is an example of a processing procedure from reception of a report frame to transmission of a gate frame in the OLT 1. Upon reception of a report frame (Step S51), the OLT 1 determines whether a sender of the received report frame is an ONU under control of the OCU 6 (Step S52). It is assumed here that information of whether each of the ONUs 2-1 to 2-6 is under control of the OCU 6 is set in the OLT 1 beforehand. There is no limitation in the method of acquiring the information.

When the sender of the received report frame is the OCU 6 or an ONU not under control of the ONU 6 (NO at Step S52), the OLT 1 designates the information stored in the report frame (an amount of transmitted data and the like) as a DBA calculation input of bandwidth allocation of the zone #1 (Step S53).

When the sender of the received report frame is an ONU under control of the OCU 6 (YES at Step S52), the OLT 1 designates the information stored in the report frame (the amount of transmitted data and the like) as a DBA calculation input of bandwidth allocation of the zone #2 (Step S54).

Subsequently, after performing each DBA calculation, the OLT 1 transmits the gate frame having stored therein a bandwidth allocation result to the OCU 6 and the ONUs 2-1 to 2-6 (Step S55).

As described above, in the present embodiment, the OCU 6 arranged between the OLT 1 and the ONUs 2-4 to 2-6 once stores, in the buffer 19, uplink signals received from the ONUs 2-5 and 2-6 that perform low-speed (1 G) uplink communication, and transmits the stored uplink signals as high-speed signals to the OLT 1. The OCU 6 directly transmits an uplink signal received from the ONU 2-4 that performs high-speed (for example, 10) uplink communication, without storing the uplink signal in the buffer 19. Therefore, bandwidth allocation can be performed independently for the ONUs 2-5 and 2-6 that perform low-speed (1 G) uplink communication under control of the OCU 6 and the other ONUs 2-1 to 2-3, respectively, and light illumination time of the ONUs 2-5 and 2-6 can overlap on the light illumination time of the ONUs 2-1 to 2-4. That is, a bandwidth allocation control multiplexed on a time axis can be performed, rather than a bandwidth allocation control which is sequentially timewise.

Even if long transmission permitted time is allocated to the ONUs 2-5 and 2-6 that perform low-speed (1 G) uplink communication under control of the OCU 6, an allocation bandwidth to the other ONUs 2-1 to 2-4 that perform high-speed uplink communication is not compressed, and as a whole, the uplink transmission permitted time can be set longer than that in conventional techniques, thereby enabling to realize a guaranteed minimum bandwidth in the uplink more easily.

Furthermore, regarding the uplink and downlink 10 G signals and the downlink 1 G signal, signal intensity is amplified by the AMPs 12 and 22, and the uplink 1 G signal is once converted to an electric signal, and then reconverted to an optical signal and transmitted as an uplink 10 G signal, thereby enabling to perform longer distance transfer than that in conventional techniques.

Second Embodiment

FIG. 19 is a configuration example of an OLT 1a according to a second embodiment of the present invention. A configuration of the communication system according to the present embodiment is identical to that of the first embodiment, except for omitting the OCU 6 according to the first embodiment and including the OLT 1a instead of the OLT 1. Constituent elements having functions identical to those of the first embodiment are denoted by like reference signs and redundant explanations thereof will be omitted.

In the first embodiment, the OCU 6 once stores, in the buffer 19, uplink signals transmitted from the ONUs 2-5 and 2-6 that perform low-speed transfer and transmits the uplink signals as high speed signals. However, in the present embodiment, without using the OCU 6, the OLT 1a once stores, in the buffer 19, uplink signals transmitted from the ONUs 2-5 and 2-6 that perform low-speed transfer and converts the uplink signals to high speed signals as in the OCU 6 according to the first embodiment.

As shown in FIG. 19, the OLT 1a according to the present embodiment includes a PON-IF (PON interface) 101 and an optical concentration communication card (OCU-C) 102.

The PON-IF (interface) 101 has identical functions as those of the OLT 1 described in the first embodiment.

The PON-IF 101 is connected to the ONUs 2-1 to 2-3 that perform uplink high-speed transfer (for example, 10 G transfer) without via the OCU-C 102. The OCU-C 102 is connected to both the ONU that performs uplink high-speed transfer and the ONU that performs uplink low-speed transfer. The WDM 11 of the OCU-C 102 is connected to the optical fiber to be connected to the PON-IF 101. Operations of the present embodiment are identical to those in the first embodiment, except that the operations of OCU 6 according to the first embodiment are performed by the OCU-C 102.

In the PON-IF 101, similarly to the first embodiment, band allocation is independently performed for the ONU that performs low-speed uplink communication under control of the OCU-C 102 and the other ONUs.

As described above, in the present embodiment, the OLT 1a includes the OCU-C 102 having identical functions as those of the OCU 6, except for the optical amplification function, instead of the OCU 6 according to the first embodiment. Therefore, identical functions as those of the first embodiment can be provided without installing the ONU 6 at a different place. When the ONU that performs low-speed transfer is not away from the OLT, a guaranteed minimum bandwidth in the uplink can be realized with a simple method.

REFERENCE SIGNS LIST

1, 1a OLT
2-1 to 2-6 ONU
3 core network
4 optical fiber
5 closure
6 OCU
7-1, 7-2, 13 splitter
11, 14, 16 WDM
12, 22 AMP
15 downlink 1 G CDR
17 uplink-signal selection unit
18 uplink 1 G Rx
19 buffer (Buffer)
20 uplink 10 G Tx
21 downlink 10 G Rx
23 control unit
101 PON-IF
102 OCU-C
181 1 G Burst Rx
182 1 G OLTMAC
201 10 G ONUMAC
202 10 G Burst Tx
31, 32 10 G-D
41, 42 1 G-D

The invention claimed is:

1. A relay device in a communication system including subscriber-side optical communication devices and a station-side optical communication device that allocates a bandwidth to the subscriber-side optical communication devices, connected to a low-speed communication device, which is one of the subscriber-side optical communication devices that transmits an optical signal having a first communication speed, and a high-speed communication device, which is one of the subscriber-side optical communication devices that transmits an optical signal having a second communication speed higher than the first communication speed, to relay communication between the low-speed communication device and the high-speed communication device and the station-side optical communication device, the relay device comprising:

a low-speed reception unit that converts an optical signal received from the low-speed communication device to an electric signal;

a buffer that buffers the electric signal; and a high-speed transmission unit that transmits, to the station-side optical communication device, a bandwidth allocation request requesting bandwidth allocation for communication from its own unit to the station-side optical communication device, and within a transmission permitted time period allocated by the station-side optical communication device, reads the electric signal stored in the buffer, converts the electric signal to an optical signal having the second communication speed, and transmits the optical signal, wherein the relay device receives the optical signal having the second communication speed from the high-speed communication device and transmits the received optical signal to the station-side optical communication device without passing through the low-speed reception unit, the buffer and the high-speed transmission unit.

2. The relay device according to claim 1, further comprising an optical amplification unit that amplifies an optical signal received from the high-speed communication device, wherein the relay device transmits an optical signal amplified by the optical amplification unit to the station-side optical communication device.

3. The relay device according to claim 1, further comprising a downlink optical amplification unit that amplifies an optical signal received from the station-side optical communication device, wherein the relay device transmits an optical signal amplified by the downlink optical amplification unit to the low-speed communication device and the high-speed communication device.

4. The relay device according to claim 1, further comprising:

an uplink-signal selection unit that selects either an optical amplification unit or the low-speed reception unit as an input destination of an optical signal received from the subscriber-side optical communication device, and inputs an optical signal received from the subscriber-side optical communication device to a selected input destination; and a control unit that controls the uplink-signal selection unit to switch an input destination to be selected, based on a transmission permitted time period stored in a bandwidth allocation notification addressed to the low-speed communication device and the high-speed communication device received from the station-side optical communication device.

5. The relay device according to claim 1, further comprising:

a control unit that controls whether to send an optical signal, received from a subscriber-side optical communication device, to the low-speed reception unit or to the station-side optical communication device based on a transmission permitted time period stored in a bandwidth allocation notification addressed to the low-speed communication device and the high-speed communication device received from the station-side optical communication device.

* * * * *